United States Patent
Sung et al.

(10) Patent No.: US 10,789,245 B2
(45) Date of Patent: Sep. 29, 2020

(54) SEMICONDUCTOR PARTS SEARCH METHOD USING LAST ALPHABET DELETION ALGORITHM

(71) Applicant: INTERBIRD CO., LTD, Busan (KR)

(72) Inventors: Soo Rak Sung, Busan (KR); Nak Bok Sung, Busan (KR)

(73) Assignee: INTERBIRD CO., LTD., Yeongdo-gu, Busan (KR)

( * ) Notice: Subject to any disclaimer, the term of this patent is extended or adjusted under 35 U.S.C. 154(b) by 0 days.

(21) Appl. No.: 15/565,600

(22) PCT Filed: Aug. 8, 2017

(86) PCT No.: PCT/KR2017/008551
§ 371 (c)(1),
(2) Date: Oct. 10, 2017

(87) PCT Pub. No.: WO2019/013385
PCT Pub. Date: Jan. 17, 2019

(65) Prior Publication Data
US 2020/0201847 A1  Jun. 25, 2020

(30) Foreign Application Priority Data
Jul. 14, 2017 (KR) .................. 10-2017-0089737

(51) Int. Cl.
*G06F 16/242* (2019.01)
*G06F 16/958* (2019.01)
(Continued)

(52) U.S. Cl.
CPC .......... *G06F 16/243* (2019.01); *G06F 16/116* (2019.01); *G06F 16/248* (2019.01);
(Continued)

(58) Field of Classification Search
CPC .. G06F 16/26; G06F 11/1441; G06F 16/2423; G06F 9/4418; G06F 11/1438;
(Continued)

(56) References Cited

U.S. PATENT DOCUMENTS 7,792,811 B2 * 9/2010 Nagarajayya ......... G06F 16/313
707/706
2005/0086224 A1 * 4/2005 Franciosa ........... G06F 16/3334
(Continued)

FOREIGN PATENT DOCUMENTS

JP  2002-230037 A  8/2002
JP  2008-083898 A  4/2008
(Continued)

*Primary Examiner* — Shyue Jiunn Hwa

(57) ABSTRACT

A method is provided for searching semiconductor parts using a last alphabet deletion algorithm. A user can newly create a query term for a relevant semiconductor part by deleting an entered relevant semiconductor part name one by one starting from a last alphabet of the query term entered by the user so that the users can search the query term complementarily in order to search a desired semiconductor part more correctly although he or she incorrectly recognizes a relevant semiconductor part name or erroneously enters a query with a typo for the semiconductor part name during the retrieval of a specification of a semiconductor part when the user desires to grasp the function and use method of the semiconductor part which the user want to use.

7 Claims, 7 Drawing Sheets

(51) Int. Cl.
*G06F 16/9535* (2019.01)
*G06F 16/11* (2019.01)
*G06F 16/248* (2019.01)

(52) U.S. Cl.
CPC ...... *G06F 16/2425* (2019.01); *G06F 16/9535* (2019.01); *G06F 16/986* (2019.01)

(58) Field of Classification Search
CPC .... G06F 16/00; G06F 16/252; G06F 16/3322; G06F 21/575; G06F 9/4411; G06F 9/44505; G06F 9/54; G06F 3/167; G06F 16/90332; G06F 40/20; G06F 40/211; G06F 40/279; G06F 40/30; G10L 15/22; G10L 15/08; G10L 15/18; G10L 15/26; G10L 15/32; G10L 2015/088; G10L 2015/223; G10L 21/003; G10L 21/02; G10L 21/057; G10L 25/60; G10L 13/00; G10L 13/08; G10L 15/00; G10L 15/07; G10L 15/19; G10L 15/28; G10L 2015/226; G10L 2015/228; G10L 2021/02082; H04M 3/56; B60N 2/002; H04R 3/02

See application file for complete search history.

(56) References Cited

U.S. PATENT DOCUMENTS

| | | | |
|---|---|---|---|
| 2006/0178918 A1* | 8/2006 | Mikurak | G06Q 10/06375 705/7.25 |
| 2009/0006396 A1* | 1/2009 | Dunlap | G06F 16/24575 |
| 2011/0055209 A1* | 3/2011 | Novac | G06Q 30/02 707/737 |

FOREIGN PATENT DOCUMENTS

| | | |
|---|---|---|
| JP | 2012-118890 A | 6/2012 |
| JP | 5408631 B2 | 2/2014 |
| KR | 10-2014-0017712 A | 2/2014 |

* cited by examiner

Fig. 2

LM324 Datasheet (PDF) - NXP Semiconductors

Part No. LM324

Download LM324 Click to view

File Size 136.83 Kbytes

Page 7 Pages

Maker PHILIPS (NXP Semiconductors)

Homepage http://www.nxp.com

Logo

Description Low power quad op amps

Fig. 7

SEMICONDUCTOR PARTS SEARCH METHOD USING LAST ALPHABET DELETION ALGORITHM

TECHNICAL FIELD

The present invention relates to a method for searching semiconductor parts using a last alphabet deletion algorithm, and more particularly, to a method for searching semiconductor parts using a last alphabet deletion algorithm, in which a user performs a repeated search by newly creating a query term for a relevant semiconductor part using an algorithm that deletes an entered relevant semiconductor part name one by one starting from a last alphabet of the semiconductor part name when he or she writes the relevant semiconductor part name incorrectly or enters a long query term with a typo for the semiconductor part name due to incorrect recognition of the relevant semiconductor part number during the retrieval of the relevant semiconductor part so that the user can search a specification of a semiconductor part corresponding to a semiconductor part name requested by him or her in consideration of the fact that various kinds of semiconductor parts performing the same function are slightly different from each other in their use methods depending on their manufacture companies, and thus a specification for the relevant semiconductor part is required to be correctly grasped to use the relevant semiconductor part, but the kinds of the manufacture companies and the company-dependent semiconductor parts are diverse, and the relevant parts name is composed of a combination of complicated meanings.

BACKGROUND ART

In general, examples of symbolic Internet search engines which are widely used by users in Korea include GOOGLE, NAVER, and DAUM. In such search engines, users usually search a desired content using a correct query term based on a relevant keyword. In addition, the search engines typically search a lot of web pages containing a word matching a query term entered by a user, and output the searched web pages to him or her so that he or she clicks on the outputted web page content to identify relevant information.

In the format of a query term, general users search desired contents based on a word corresponding to a core keyword, but studies are in progress on various search methods such as a sentence-based search method and a user voice recognition-based search method.

Korean Patent Laid-Open Publication No. 10-2008-0113943 discloses an Internet search service method and system in which when a user enters a query term and selects a specific search site to request a search of information related to the query term using a user program through a user terminal that can access the Internet to request, the user program outputs a search result page associated with the query term of the specific search site to a first browser included in the user program, and when the user selects a specific site from the search result page of the first browser, the user program or the first browser analyzes information of the selected specific site and outputs a separate search result page associated with the query term to a second browser when a result of analysis of information satisfies a predetermined requirement.

However, the conventional technology is characterized in that it provides a search result different from a search result provided by the search site using other search category having no relation to a search category-dependent URL of the search site selected by the user, but still has a limitation in a search of a specific technology due to a problem in that it does not specialize in a search for a specific field.

In addition, Korean Patent Laid-Open Publication No. 10-2016-0123485 entitled "Method and System For Searching Interested Product and Part Based on Image is directed to an image-based database construction method and system, and a method and system for searching interested product and part using the same. Specifically, each image and each keyword for an product and an interested part are matched each other, a user can enter an image to search an interested product and an interested part through the construction of a database in which the matched image and keyword is stored by groups, and a part group used in the interested product and a product group associated with the interested part can be provided as a search result.

However, although such a conventional technology provides a method and system for searching a product or a part which a user desires to search, an image-based database is required to be constructed, leading to an increase in resources on the system.

Furthermore, since an image for a product or a part which the user desires to search is used as an input means, the user must secure an image file for a relevant product or part and further there occurs a problem of overload of a resource and low search speed according to an image matching technology for image retrieval. Besides, in the case of semiconductor parts, there is a problem in that images of the semiconductor parts are nearly similar to each, resulting in low search accuracy.

DISCLOSURE OF INVENTION

Technical Problem

Accordingly, the present invention has been made to solve the aforementioned problems occurring in the prior art, and it is an object of the present invention to provide a method for searching semiconductor parts using a last alphabet deletion algorithm in which a user can search specifications for semiconductor parts provided by semiconductor part manufacturers so that the user can obtain correct information regarding a semiconductor part required by the user in the field of semiconductor parts, and in which although the user writes a semiconductor part number incorrectly or a query term has a typo when writing a semiconductor part name usually used as the query term in the search of the semiconductor part, he or she can search either a semiconductor part corresponding to the most similar part number or a semiconductor part matching a relevant part number along with information regarding a semiconductor part that starts or ends as the relevant part number or contains the relevant part number using an algorithm that deletes a last alphabet of the incorrectly written part number so that the user can correctly utilize the function and characteristics of a relevant semiconductor part as well as a pin-based part use method.

Technical Solution

To achieve the above objects, the present invention provides a method for searching semiconductor parts using a last alphabet deletion algorithm, the method including the steps of: a specification input step S110 of inputting specifications for semiconductor parts manufactured by semiconductor part manufacturers through a part specification input device 110; a part-dependent information construction step S120 of extracting information described in the specifications for the semiconductor parts uploaded in the specification input step S110 and constructing the information by semiconductor parts; a query entry step S130 of allowing a user to enter a query term for a semiconductor part which the user desire to search so as to obtain information regarding the semiconductor part; a part search step S140 of comparing the query term entered by the user in the query entry step S130 with words contained in the information regarding the semiconductor parts constructed in the part-dependent information construction step S120, and performing a part search; a search result output step S150 of outputting information regarding a semiconductor part which is constructed in the part-dependent information construction step S120 and contains a word matching the query term entered by the user in the query entry step S130; a part name length determination step S160 of determining whether or not a word length of a part number used as the query term for the semiconductor part which the user desires to search is greater than a specific size; and a last alphabet deletion step S170 of sequentially entering the query term of the query entry step S130 for search in such a manner to delete a last alphabet of the word entered by the user one by one in order to derive a search result from the query term consisting of a word of more than the specific length in the part name length determination step S160.

Advantageous Effects

According to the method for searching semiconductor parts using a last alphabet deletion algorithm of the present invention, a user can newly create a query term for a relevant semiconductor part by deleting an entered relevant semiconductor part name one by one starting from a last alphabet of the query term entered by the user so that the users can search the query term complementarily in order to search a desired semiconductor part more correctly although he or she incorrectly recognizes a relevant semiconductor part name or erroneously enters a query with a typo for the semiconductor part name during the retrieval of a specification of a semiconductor part when the user desires to grasp the function and use method of the semiconductor part which the user want to use because a wide variety of kinds of semiconductor parts having different functions are put on the market and semiconductor parts performing the same function are slightly different from each other in their use methods depending on their manufacture companies. In addition, the present invention can provide the user with a semiconductor part matching the query term entered by the user, a semiconductor part starting or ending as the query term entered by the user, or a semiconductor part including the query term entered by the user with respect to a derived search result so that a specification of a semiconductor part which the user wants can be presented ultimately.

BRIEF DESCRIPTION OF THE DRAWINGS

The above and other objects, features and advantages of the present invention will be apparent from the following detailed description of the preferred embodiments of the invention when taken in conjunction with the accompanying drawings, in which:

FIG. 2 is a view showing an example of a search result outputted through an output device of a semiconductor part search system using a last alphabet deletion algorithm according to an embodiment of the present invention;

FIG. 7 is a view showing an example of a search result outputted search result output step in a semiconductor part search method using a last alphabet deletion algorithm according to another embodiment of the present invention.

BEST MODE FOR CARRYING OUT THE INVENTION

Figure 1:
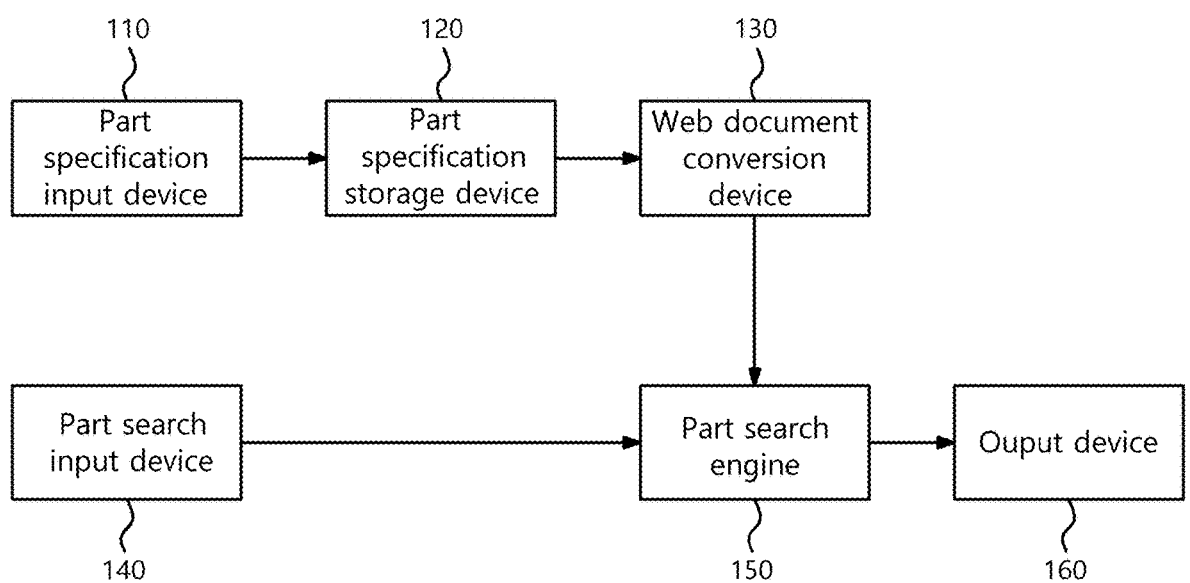
FIG. 1 is a block diagram showing a configuration of a semiconductor part search system using a last alphabet deletion algorithm according to an embodiment of the present invention.

The present invention for achieving the above-mentioned effects is directed to a method for searching semiconductor parts using a last alphabet deletion algorithm. In the meantime, in the detailed description and the accompanying drawings, illustration and explanation on the construction and operation which a person skilled in the art can easily understand will be briefly made or will be omitted to avoid redundancy. In particular, illustration and explanation on the detailed technical construction and operation of elements, which have no direct connection with the technical features of the present invention, will be omitted, and only the technical constructions directly related with the present invention will be briefly illustrated and explained.

Hereinafter, a method for searching semiconductor parts using a last alphabet deletion algorithm according to the present invention will be described in detail.

A semiconductor part search system 100 using a last alphabet deletion algorithm according to an embodiment of the present invention may include a part specification input device 110, a part specification storage device 120, a web document conversion device 130, a part search input device 140, a part search engine 150, and a output device 160.

The part specification input device 110 inputs specifications containing a description for semiconductor parts manufactured by manufacturers that manufacture semiconductor parts, and a function of and a method for use of a relevant part. The part specification storage device 120 stores the specifications of the electronic file format uploaded to the part specification input device 110. The web document conversion device 130 converts the specifications stored in the electronic file format in the part specification storage device 120 into HTML files in the webpage format. The part search input device 140 is a device that allows a user to enter a word, i.e., a query term for a semiconductor part which the user desired to search. Before the user uses a relevant semiconductor part, he or she is required to grasp information regarding the function and use method of the relevant semiconductor part to enable the more correct use of the semiconductor part. Thus, the user enters the name of the relevant semiconductor part to search the specification of the relevant semiconductor part. The part search engine 150 compares the name of the relevant semiconductor part entered by the user with the names of the semiconductor parts stored in the part specification storage device 120 based on an input value inputted from the part search input device 140, searches a content matching the name of the relevant semiconductor part or containing a relevant part name, and transmits a result of search of the content to the output device 160.

The part-dependent information construction step S120 in the method for searching semiconductor parts using a last alphabet deletion algorithm according to an embodiment of the present invention may include constructing information obtained by converting the specifications for the semiconductor parts inputted in an electronic file format in the specification input step S110 into an HTML file format that users can easily view on a general web page using the web document conversion device 130.

The part-dependent information construction step S120 in the semiconductor part search method using a last alphabet deletion algorithm according to another embodiment of the present invention may include: word separation step S121 of separating respective words constituting each of sentences contained in the specifications for the semiconductor parts uploaded in the specification input step S110; a description word extraction step S122 of extracting words necessary for a description from the words contained in the specifications, which are separated in the word separation step S121; an extracted word entry step S123 of entering the words extracted in the description word extraction step S122 one by one in a specific array; a word length determination step S124 of measuring and determining the length, i.e., the number of the extracted words stored in a separate storage space in the extracted word entry step S123; and a brief description designation step S125 of designating the words determined in the word length determination step S124 as words which are to be used in the brief description.

The search result output step S150 in the semiconductor part search method using a last alphabet deletion algorithm according to another embodiment of the present invention may include: a brief description acquisition step S151 of acquiring the words to be used in the brief description, which are designated in the brief description designation step S12; a word-dependent link setting step S152 of setting a separate link by the words acquired in the brief description acquisition step S151; a brief description output step S153 of displaying the words by which the link is set in the word-dependent link setting step S152 on the brief description of an output screen; a link word click step S154 of determining whether or not the user clicks on a word for the relevant semiconductor part, which is described in the brief description; and a query addition step S155 of, if the user clicks on the word corresponding to the brief description, adding the clicked word to a search entry box searched by descriptions of the query entry step S130 to perform a search matching a relevant word or containing the relevant word.

The part search step S140 in the semiconductor part search method using a last alphabet deletion algorithm according to another embodiment of the present invention may include: a search result creation step S141 of comparing the query term for a semiconductor part, entered in the query entry step S130 with the words contained in the information of by semiconductor parts, which is constructed in the part specification storage device 120, and creating a search result of extraction of information regarding all the semiconductor parts, which contains the entered query term; a matching value search step S142 of sequentially comparing the query term entered by the user with the search result created in the search result creation step S141, and, if there exists a matching word, separately searching only a semiconductor part corresponding to the matching word; a matching value array creation step S143 of storing a result for the semiconductor part corresponding to a result of search in the matching value search step S142; a starting value search step S144 of sequentially comparing the query term entered by the user with the search result created in the search result creation step S141, and separately searching only a semiconductor part containing words contained in information regarding all the semiconductor parts, which start as the word entered by the user and an additional alphabet follows; a starting value array creation step S145 of storing a result for the semiconductor part corresponding to a result of search in the starting value search step S144; an ending value search step S146 of sequentially comparing the query term entered by the user with the search result created in the search result creation step S141, and separately searching only a semiconductor part containing words contained in information regarding all the semiconductor parts, which terminate as the word entered by the user; an ending value array creation step S147 of storing a result for the semiconductor part corresponding to a result of search in the ending value search step S146; an inclusion value array creation step S148 of storing a result for the semiconductor parts remained after being subjected to the matching value search step S142, the starting value search step S144, and the ending value search step S146; and a shortcut creation step S149 of creating a shortcut so that the user can identify information regarding the semiconductor part, searched by the user using the created matching value array, the created starting value array, the created ending value array, and the created inclusion value array. The search result output step S150 may include outputting, to the user, a search result included in a matching value array, a starting value array, an ending value array, and an inclusion value array of the shortcut by identifying the shortcut created in the shortcut creation step S149 using indices such as matching, starting, ending, and including.

BEST MODE

Hereinafter, preferred embodiments of the present invention will be described in detail with reference to FIGS. 1 to 7 to so that the present disclosure can be easily carried out by a person of ordinary skill in the art to which the present disclosure pertains. The preferred embodiments of the present invention can be modified in various forms, and it should be understood that the scope of the present invention is not construed to be limited to the embodiments described and illustrated herein. The embodiments of the present invention are provided only for illustrative purposes and for full understanding of the present invention by those skilled in the art. Therefore, in the drawings, the shapes and relative sizes of constituent elements may be exaggerated for clarity and convenience of explanation. It should be noted that the same elements or parts in the drawings are denoted by the same reference numerals although shown in different figures. In the meantime, in the accompanying drawings and the detailed description, illustration and explanation on the construction and operation of a part specification input device, a part search input device, a part search engine, and an output device which a person skilled in the art can easily understand will be briefly made or will be omitted to avoid redundancy. In particular, illustration and explanation on the detailed technical construction and operation of elements, which have no direct connection with the technical features of the present invention, will be omitted, and only the technical constructions directly related with the present invention will be briefly illustrated and explained.

FIG. 1 is a block diagram showing a configuration of a semiconductor part search system using a last alphabet deletion algorithm according to an embodiment of the present invention.

As shown in FIG. 1, a semiconductor part search system 100 using a last alphabet deletion algorithm according to an embodiment of the present invention includes a part specification input device 110, a part specification storage device 120, a web document conversion device 130, a part search input device 140, a part search engine 150, and a output device 160.

The part specification input device 110 inputs specifications containing a description for semiconductor parts manufactured by manufacturers that manufacture semiconductor parts, and a function of and a method for use of a relevant part. The inputted specifications are generally in the format of various computer electronic files such as PDF file formats produced by each semiconductor part company The part specification input device 110 can input the specifications of the electronic file format in such a manner as to upload them to the semiconductor part search system 100. The reason for this is that since the semiconductor part manufacturers are dispersedly distributed in the world, the uploading of the files is the most efficient to provide the specifications as information regarding the semiconductor parts to a single semiconductor part search system 100.

The part specification storage device 120 stores the specifications of the electronic file format uploaded to the part specification input device 110. The part specification storage device 120 extracts information such as a part number (i.e., part No.), a file path, a file size, a page number, a manufacturer, a manufacturer site, a brief description of a relevant semiconductor part and stores the specifications for the semiconductor parts in the form of a database along with the extracted information and the specification electronic files.

The web document conversion device 130 converts the specifications stored in the electronic file format in the part specification storage device 120 into HTML files in the webpage format. Some users may have an environment where they can view various formats of electronic files such as PDF files, but the web document conversion device 130 converts the electronic files into HTML files which the users can view through a web browser on the Internet to which they have an access.

The part search input device 140 is a device that allows a user to enter a word, i.e., a query term for a semiconductor part which the user desired to search. Before the user uses a relevant semiconductor part, he or she is required to grasp information regarding the function and use method of the relevant semiconductor part to enable the more correct use of the semiconductor part. Thus, the user enters the name of the relevant semiconductor part to search the specification of the relevant semiconductor part.

The part search engine 150 compares the name of the relevant semiconductor part entered by the user with the names of the semiconductor parts stored in the part specification storage device 120 based on an input value inputted from the part search input device 140, searches a content matching the name of the relevant semiconductor part or containing a relevant part name, and transmits a result of search of the content to the output device 160.

FIG. 2 is a view showing an example of a search result outputted through an output device of a semiconductor part search system using a last alphabet deletion algorithm according to an embodiment of the present invention.

As shown in FIG. 2, the output device 160 outputs a result of search from the part search engine 150 on a screen. The output device 160 can output a brief description including a part number (i.e., part No.) of a relevant semiconductor part, a part specification file path on which a specification can be downloaded or a part specification page path converted by the web document conversion device, a file size and a page number of a relevant part specification, a manufacturer name, a hyperlinked site address of a manufacturer, and the kind of a relevant part, which are stored in the part specification storage device 120 with respect to the semiconductor part searched by the part search engine 150.

Figure 3:
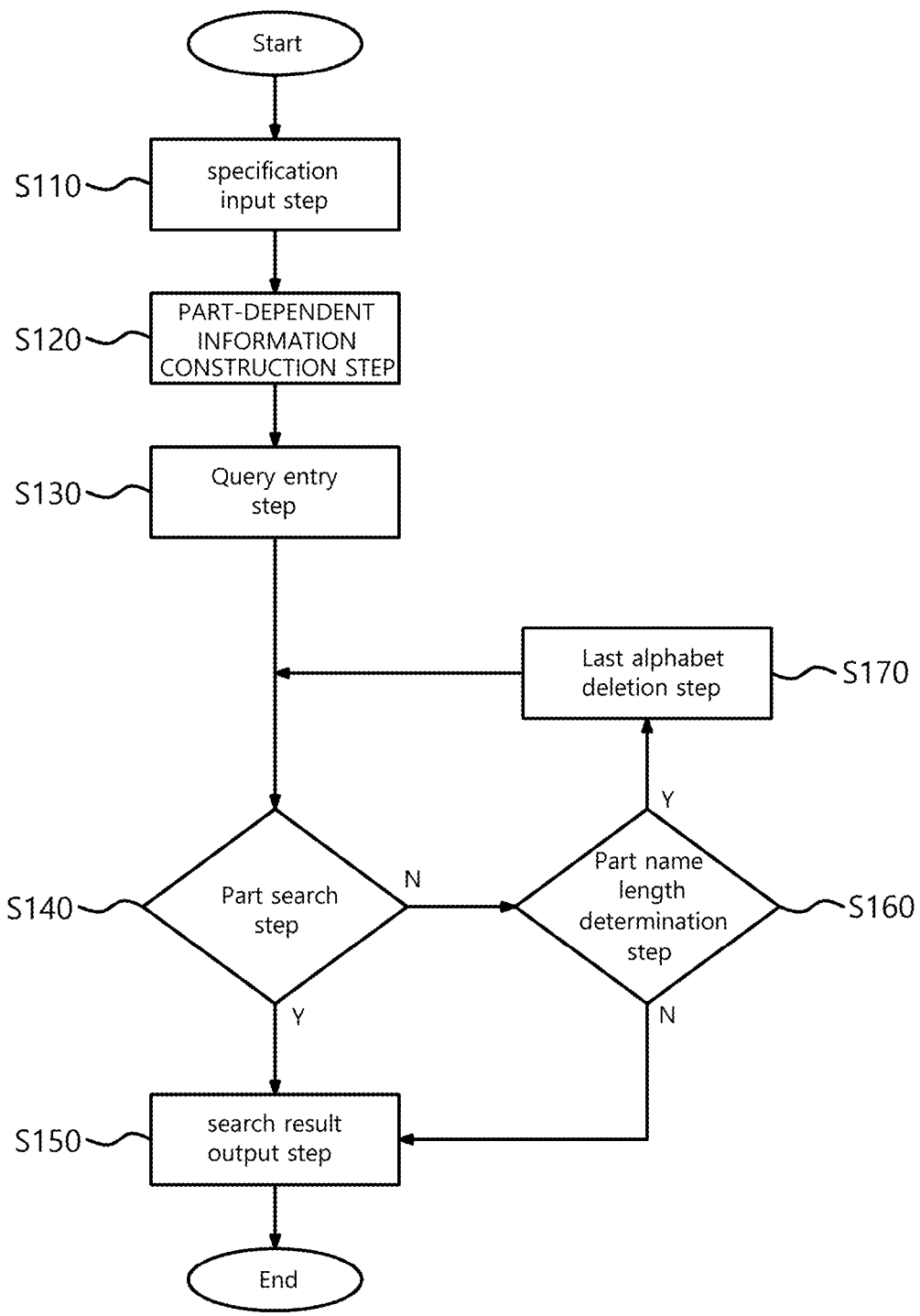
FIG. 3 is a flowchart showing a semiconductor part search method using a last alphabet deletion algorithm according to an embodiment of the present invention.

FIG. 3 is a flowchart showing a semiconductor part search method using a last alphabet deletion algorithm according to an embodiment of the present invention.

As shown in FIG. 3, the semiconductor part search method using a last alphabet deletion algorithm includes a specification input step S110, a part-dependent information construction step S120, a query entry step S130, a part search step S140, a search result output step S150, a part name length determination step S160, and a last alphabet deletion step S170.

The specification input step S110 is a step of inputting specifications for semiconductor parts manufactured by semiconductor part manufacturers through the part specification input device 110. The specifications for the semiconductor parts inputted in the specification input step S110 are directly uploaded in an electronic file format by the semiconductor part manufacturers that have manufactured the respective semiconductor parts.

The part-dependent information construction step S120 is a step of extracting information such as a part number (i.e., part No.), a specification file path stored in the part specification storage device 120, a specification file size, a page number, a manufacturer site, and a brief description of a relevant semiconductor part, which are described in the specifications for the semiconductor parts uploaded in the specification input step S110 and constructing the information by semiconductor parts based on the extracted information and specification electronic files. The information constructed in the part-dependent information construction step S120 may be stored in the form of a database.

In addition, the part-dependent information construction step S120 may include constructing information obtained by converting the specifications for the semiconductor parts inputted in an electronic file format in the specification input step S110 into an HTML file format that users can easily view on a general web page using the web document conversion device 130.

The query entry step S130 is a step of allowing a user to enter a query term for a semiconductor part which the user desires to search so as to obtain information regarding the semiconductor part. Users who desire to use the semiconductor parts may have information regarding a relevant part, but they generally needs information regarding a function of a relevant semiconductor part and a use method such as a connection method of respective pins which are required to be connected to perform the function in order to use a new semiconductor part. This information is more correctly described in the specification of the relevant semiconductor part provided by the manufacturer, and the users enter the name of the semiconductor part in the query entry step S130 in order to search such information. The name of the semiconductor part inputted in the query entry step S130 is mostly a part number.

The part search step S140 is a step of comparing the query term entered by the user in the query entry step S130 with words contained in the information regarding the semiconductor parts constructed in the part specification storage device 120 in the part-dependent information construction step S120, and performing a part search. Typically, in many cases, a user enters a part number so as to distinguish between the semiconductor parts in the query entry step S130, and thus a comparison between part numbers is also generally made in the part search step S140. In some embodiments, the user may perform a part search based on a manufacturer or the kind of a semiconductor part described in the brief description of the semiconductor part.

The search result output step S150 is a step of outputting information regarding a semiconductor part which is constructed in the part-dependent information construction step S120 if it is determined there exists information regarding a semiconductor part containing a word matching the query term entered by the user in the query entry step S130. The information regarding the semiconductor part outputted in the search result output step S150 includes a brief description including a part number (i.e., part No.) of a relevant semiconductor part, a part specification file path on which a specification can be downloaded or a part specification page path converted by the web document conversion device, a file size and a page number of a relevant part specification, a manufacturer name, a hyperlinked site address of a manufacturer, and the kind of a relevant part.

On the other hand, if it is determined in the search result output step S150 that there is no word matching the query term entered by the user, the program proceeds to the part name length determination step S160 where the number of the words entered by the user is measured to determine whether or not the number of the words is a length of a part name suitable for search of the semiconductor part.

The part name length determination step S160 is a step of determining whether or not a word length of a part number used as the query term for the semiconductor part which the user desires to search is greater than a specific size. Generally, the part number used as a query term for the semiconductor part which the user desires to search has mostly a word length greater than a specific size although there is a difference between semiconductor part manufacturers. Thus, if it is determined that the number of the words entered by the user is measured and the measured word number is not greater than specific size, the user may be informed of a separate warning indicating that there is an error in the entered query term itself. In the semiconductor part search method using a last alphabet deletion algorithm according to the present invention, if the query term entered by the user does not consist of four letters, the output device 160 may provide a separate warning to the user while displaying a result page having no search in the search result output step S150.

The last alphabet deletion step S170 is a step of deleting a last alphabet of the word entered by the user in order to derive a search result from the query term consisting of a word of more than the specific length in the part name length determination step S160. In the last alphabet deletion step S170, there is no matching result for search in the case where the user writes the query term for the semiconductor part incorrectly or the query term has a typo, or the user incorrectly recognizes the query term itself in the entry of the query term for the semiconductor part which the user desires to search, for example, the user enters LM3245678 as the query term due to incorrect writing or enters LM3244444444 as the query term due to typographical error although a part number of a relevant semiconductor part is LM324. Thus, the user can delete a last letter of the query term entered by the user one by one even without re-entering the query term so that a query term from which a last letter has been deleted one by one is provided as an entry word so that information regarding a semiconductor part whose part number is LM324 can be searched.

In the last alphabet deletion step S170, based on a new word from which a last letter has been deleted, the new word is used as the entered word of the query entry step S130, or the query term entered by the user in the query entry step S130 is compared with the words contained in the information regarding the semiconductor parts in the part search step S140 to repeatedly perform a part search operation which searches information regarding a specification of a semiconductor part containing the same word as a word from which a last letter has been deleted and outputs a result of information search to the user through the output device 160 so that the user can be provided with information regarding the semiconductor part which the user may writes incorrectly or which may have a typographical error, or which the user may recognize incorrectly.

Figure 4:
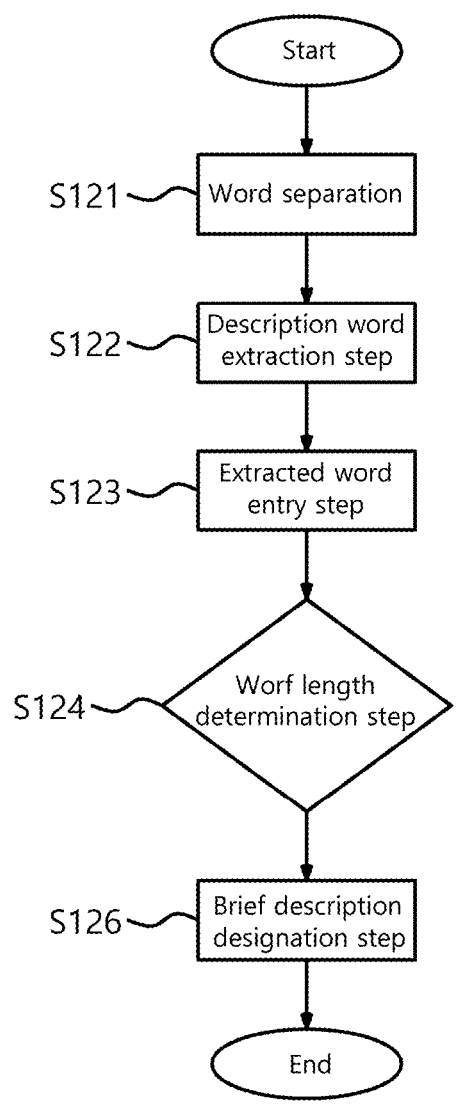
FIG. 4 is a flowchart showing a part-dependent information construction step in a semiconductor part search method using a last alphabet deletion algorithm according to another embodiment of the present invention.

FIG. 4 is a flowchart showing a part-dependent information construction step in a semiconductor part search method using a last alphabet deletion algorithm according to another embodiment of the present invention.

As shown in FIG. 4, the part-dependent information construction step S120 includes a word separation step S121, a description word extraction step S122, an extracted word entry step S123, a word length determination step S124, and a brief description designation step S125. In the part-dependent information construction step S120, information necessary for the brief description can be constructed from a specification of a semiconductor part in order to provide a brief description for the semiconductor part which users desire to search.

The word separation step S121 is a step of separating respective words constituting each of sentences contained in the specifications for the semiconductor parts uploaded in the specification input step S110. In the word separation step S121, words such as a noun, a verb and the like, which have an meaning necessary for the description are separated from the respective words constituting each of sentences.

The description word extraction step S122 is a step of extracting words necessary for a description from the words contained in the specifications, which are separated in the word separation step S121. In the description word extraction step S122, words capable of representing the characteristics of a relevant part such as the kind or function of the semiconductor part are extracted from the words described in the specifications.

The extracted word entry step S123 is a step of entering the words extracted in the description word extraction step S122 one by one in a specific array. In the extracted word entry step S123, the extracted words are entered in a separate storage device such as an array for a procedure for confirming a word to be added to the brief description of the semiconductor parts.

The word length determination step S124 is a step of measuring and determining the length, i.e., the number of the extracted words stored in a separate storage space in the extracted word entry step S123. In the word length determination step S124, only words consisting of three letters or more are designated to the brief description based on the determination that a word consisting of at least three letters is necessary to have a meaning in the description of a relevant semiconductor part.

The brief description designation step S125 is a step of designating the words determined in the word length determination step S124 as words which are to be used in the brief description. In the brief description designation step S125, the words designated to the brief description are dividedly stored as separate items in the construction of information regarding the relevant semiconductor part so that the determined words can be outputted as a brief description for the relevant semiconductor part to the user.

Figure 5:
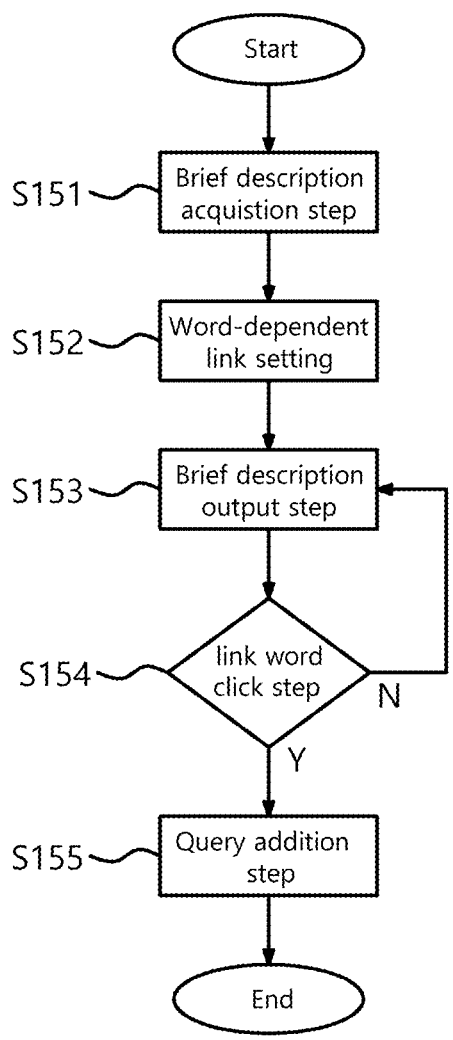
FIG. 5 is a flowchart showing a search result output step in a semiconductor part search method using a last alphabet deletion algorithm according to another embodiment of the present invention.

FIG. 5 is a flowchart showing a search result output step in a semiconductor part search method using a last alphabet deletion algorithm according to another embodiment of the present invention.

As shown in FIG. 5, the search result output step S151 includes a brief description acquisition step S151, a word-dependent link setting step S152, a brief description output step S153, a link word click step S154, and a query addition step S155.

The brief description acquisition step S151 is a step of acquiring the words to be used in the brief description, which are designated in the brief description designation step S12. In the brief description acquisition step S151, the words to be used in the brief description constructed are obtained to be outputted to the brief description of a search result according to a search request by the user.

The word-dependent link setting step S152 is a step of setting a separate link by the words acquired in the brief description acquisition step S151. The words to be used in the brief description fall within words that describe the relevant semiconductor part and simultaneously are useful for search of similar other semiconductor parts. Thus, a link is set by each word.

The brief description output step S153 is a step of displaying the words by which the link is set in the word-dependent link setting step S152 on the brief description of an output screen.

The link word click step S154 is a step of determining whether or not the user clicks on a word for the relevant semiconductor part, which is described in the brief description.

The query addition step S155 is a step of, if the user clicks on the word corresponding to the brief description in the link word click step S154, adding the clicked word to a search entry box searched by descriptions of the query entry step S130 to perform a search matching a relevant word or containing the relevant word. Through this step, in the case where the user knows a related part number although he or she incorrectly knows a part number which is to be searched, the user can search similar other semiconductor parts personally from a brief description acquired by searching a semiconductor part assigned with the related part number.

Figure 6:
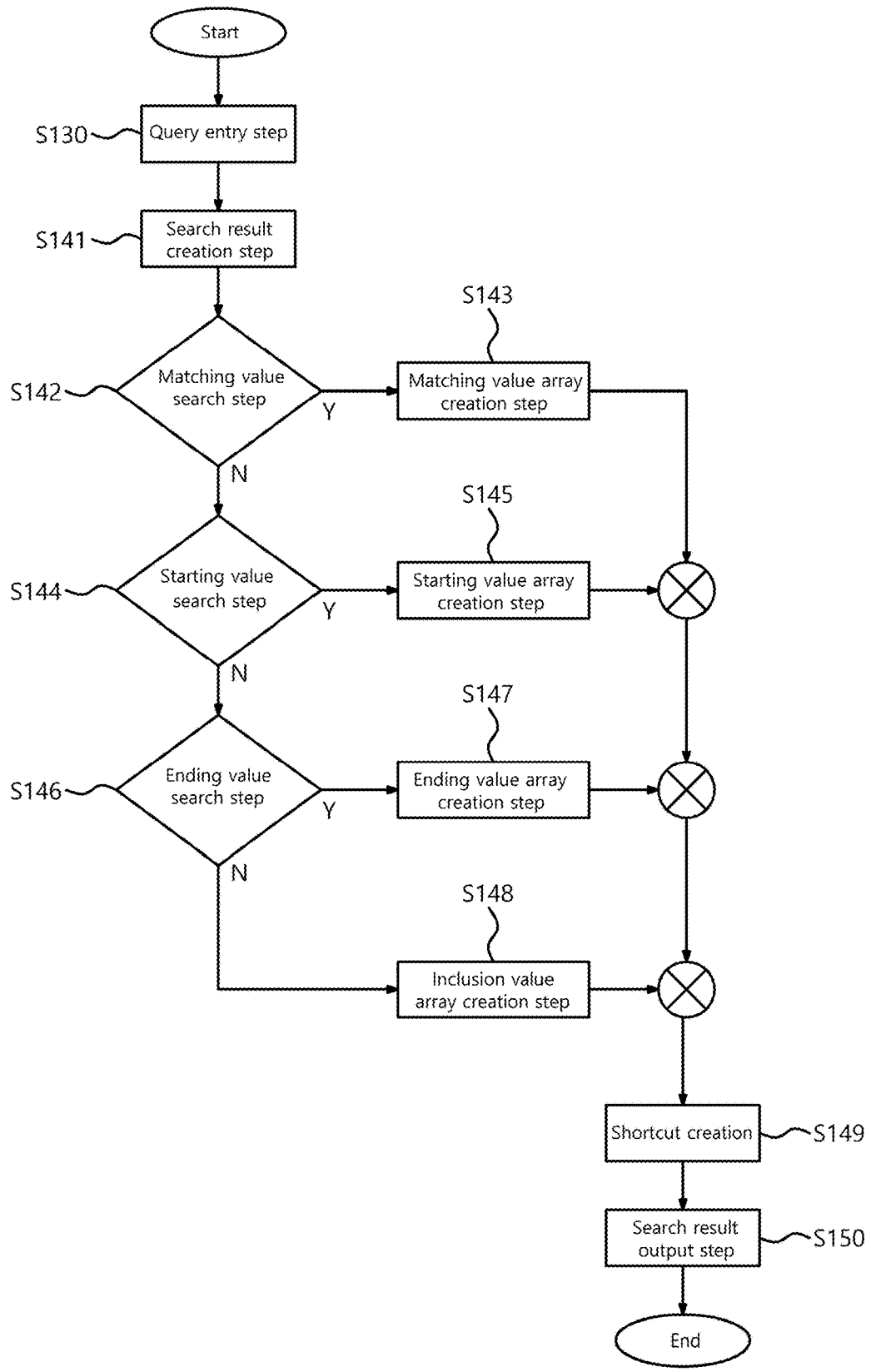
FIG. 6 is a flowchart showing a part search step in a semiconductor part search method using a last alphabet deletion algorithm according to another embodiment of the present invention.

FIG. 6 is a flowchart showing a part search step in a semiconductor part search method using a last alphabet deletion algorithm according to another embodiment of the present invention.

As shown in FIG. 6, the part search step S140 includes a search result creation step S141, a matching value search step S142, a matching value array creation step S143, a starting value search step S144, a starting value array creation step S145, an ending value search step S146, an ending value array creation step S147, an inclusion value array creation step S148, and a shortcut creation step S149.

The search result creation step S141 is a step of comparing the query term for a semiconductor part, entered in the query entry step S130 with the words contained in the information of by semiconductor parts, which is constructed in the part specification storage device 120, and creating a search result of extraction of information regarding all the semiconductor parts, which contains the entered query term.

The search result creation step S141 employs a format in which the search result is inputted to a separate array.

The matching value search step S142 is a step of sequentially comparing the query term entered by the user with the search result created in the search result creation step S141, and, if there exists a matching word, separately searching only a semiconductor part corresponding to the matching word.

The matching value array creation step S143 is a step of storing a result for the semiconductor part corresponding to a result of search in the matching value search step S142. The matching value array creation step S143 employs a format in which the result for the semiconductor part created in the matching value array creation step S143 is inputted one by one to a separate array. Even after a matching value array created is outputted to the user, information regarding the semiconductor part can be identified continuously through a link, and thus it needs to be stored in a storage device such as a memory until the completion of a section.

The starting value search step S144 is a step of sequentially comparing the query term entered by the user with the search result created in the search result creation step S141, and separately searching only a semiconductor part containing words contained in information regarding all the semiconductor parts, which start as the word entered by the user and an additional alphabet follows.

The starting value array creation step S145 is a step of storing a result for the semiconductor part corresponding to a result of search in the starting value search step S144. The starting value array creation step S145 employs a format in which the result for the semiconductor part, which is created in the starting value array creation step S145 is inputted one by one to a separate array. Even after a starting value array created is outputted to the user like the matching value array, information regarding the semiconductor part can be identified continuously through a link connected to each word, and thus it may be stored in a storage device such as a separate memory until the completion of a section.

The ending value search step S146 is a step of sequentially comparing the query term entered by the user with the search result created in the search result creation step S141, and separately searching only a semiconductor part containing words contained in information regarding all the semiconductor parts, which terminate as the word entered by the user.

The ending value array creation step S147 is a step of storing a result for the semiconductor part corresponding to a result of search in the ending value search step S146. The ending value array creation step S147 employs a format in which the result for the semiconductor part, which is created in the ending value array creation step S147 is inputted one by one to a separate array. Even after an ending value array created is outputted as the search result to the user like the matching value array, information regarding the semiconductor part can be identified continuously through a link connected to each word, and thus it may be stored in a storage device such as a separate memory until the completion of a section.

The inclusion value array creation step S148 is a step of storing a result for the semiconductor parts remained after being subjected to the matching value search step S142, the starting value search step S144, and the ending value search step S146. The inclusion value array creation step S148 employs a format in which the result for the semiconductor part, which is created in the inclusion value array creation step S148 is inputted one by one to a separate array. Even after an inclusion value array created is outputted as the search result to the user, information regarding the semiconductor part can be identified continuously through a link connected to each word, and thus it may be stored in a storage device such as a separate memory until the completion of a section.

The shortcut creation step S149 is a step of creating a shortcut so that the user can identify information regarding the semiconductor part, searched by the user using the created matching value array, the created starting value array, the created ending value array, and the created coverage value array. The shortcut creation step S149 can create the shortcut using a method which sets an identifier for each array or combines the arrays to a single array, and then performs a setting step for distinguishing between the respective arrays. Even after the created shortcut array is outputted as the search result to the user, information regarding the semiconductor part can be identified through a link connected to each word, and thus it needs to be stored in a storage device such as a separate memory until the completion of a section.

Figure 7:
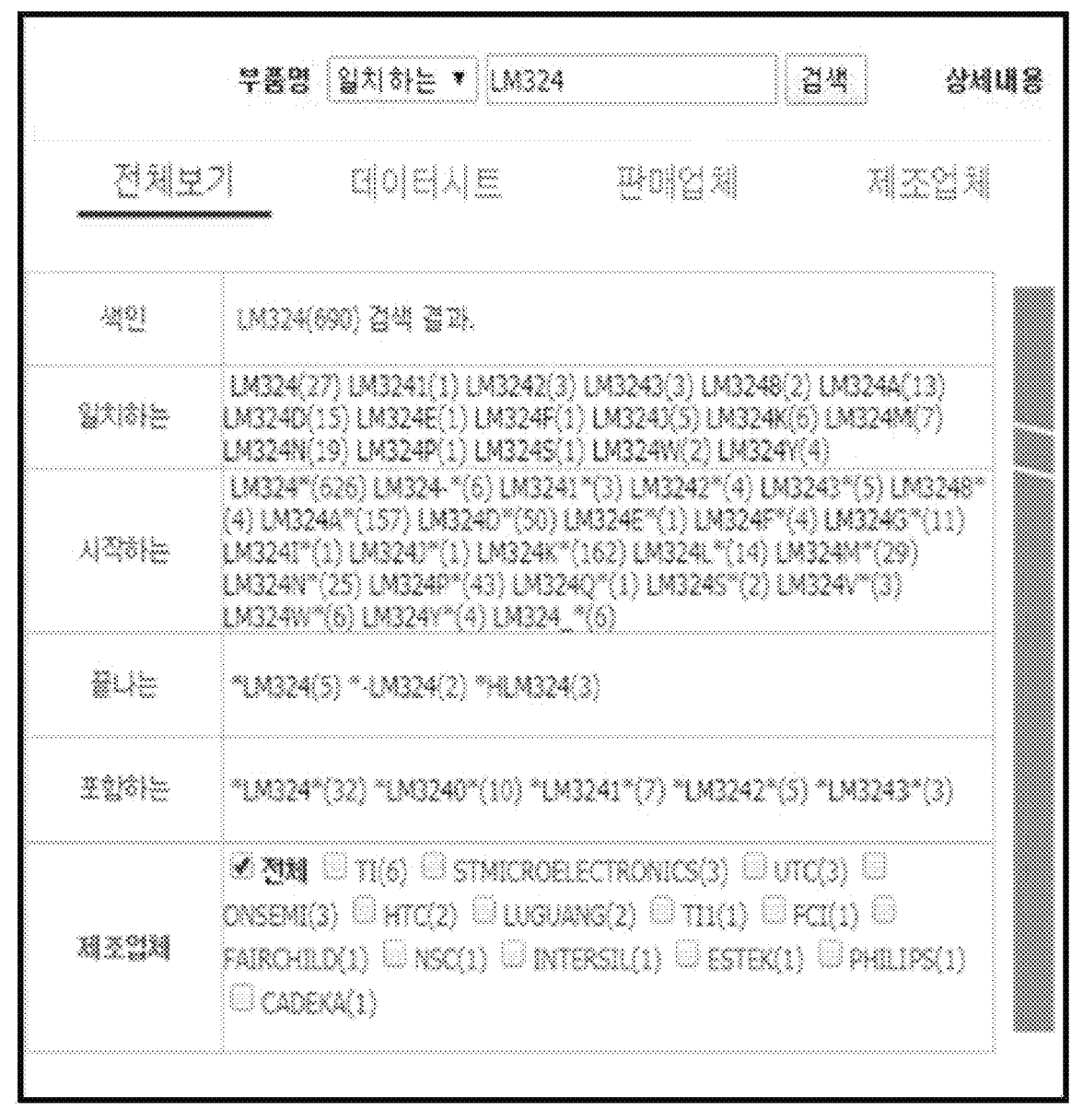

FIG. 7 is a view showing an example of a search result outputted search result output step in a semiconductor part search method using a last alphabet deletion algorithm according to another embodiment of the present invention.

As shown in FIG. 7, the search result output step S150 includes, outputting to, the user a search result included in a matching value array, a starting value array, an ending value array, and an inclusion value array of the shortcut by identifying the shortcut created in the shortcut creation step S149 using indices such as matching, starting, ending, and including. In the search result output step S150, a result for the query term entered by the user is outputted to the user. In addition, in the case where the numbers of the matching value array, the starting value array, the ending value array, and the inclusion value array of the shortcut are not sufficient for creating an output screen, the search result may be outputted so that the matching value array, the starting value array, the ending value array, and the inclusion value array can be arranged properly with respect to different indices. For example, in the case where the number of search results matching the query term entered by the user is small and the number of search results starting as the query term entered by the user is large, up to one letter can be selected from among the search results starting as the query term entered by the user so as to be additionally displayed on the search results matching the query term entered by the user.

As described above, while the method for searching semiconductor parts using a last alphabet deletion algorithm according to the present invention has been described and illustrated in connection with specific exemplary embodiments with reference to the accompanying drawings, it will be readily appreciated by those skilled in the art that various modifications and changes can be made to the present invention within the technical spirit and scope of the present invention defined in the claims.

INDUSTRIAL APPLICABILITY

The method for searching semiconductor parts using a last alphabet deletion algorithm of the present invention enables a user to newly create a query term for a relevant semiconductor part by deleting an entered relevant semiconductor part name one by one starting from a last alphabet of the query term entered by the user so that the users can search the query term complementarily in order to search a desired semiconductor part more correctly although he or she incorrectly recognizes a relevant semiconductor part name or erroneously enters a query with a typo for the semiconductor part name during the retrieval of a specification of a semiconductor part when the user desires to grasp the function and use method of the semiconductor part which the user want to use because a wide variety of kinds of semiconductor parts having different functions are put on the market and semiconductor parts performing the same function are slightly different from each other in their use methods depending on their manufacture companies. In addition, the present invention can provide the user with a semiconductor part matching the query term entered by the user, a semiconductor part starting or ending as the query term entered by the user, or a semiconductor part including the query term entered by the user with respect to a derived search result so that a specification of a semiconductor part which the user wants can be presented ultimately, leading to an increase in utilization of the present invention for a user who produces and manufactures a new product using the semiconductor part.

The invention claimed is:
1. A method for searching semiconductor parts using a last alphabet deletion algorithm, the method comprising the steps of:
a specification input step S110 of inputting specifications for semiconductor parts manufactured by semiconductor part manufacturers through a part specification input device 110;
a part-dependent information construction step S120 of extracting information described in the specifications for the semiconductor parts uploaded in the specification input step S110 and constructing the information of semiconductor parts, wherein the information is constructed by converting content of the specifications to Hypertext Markup Language (HTML) format;
a query entry step S130 of allowing a user to enter a query term for a semiconductor part which the user desires to obtain information regarding the semiconductor part;
a part search step S140 of comparing the query term entered by the user in the query entry step S130 with words contained in the information regarding the semiconductor parts constructed in the part-dependent information construction step S120, and performing a part search;
a search result output step S150 of outputting information regarding a semiconductor part which is constructed in the part-dependent information construction step S120 and contains a word matching the query term entered by the user in the query entry step S130;
a part name length determination step S160 of determining whether or not a word length of a part number used as the query term for the semiconductor part which the user desires to search is greater than a specific size, the entered query term entered consisting of one word; and
a last alphabet deletion step S170 for sequentially redefining the query term of the query entry step S130 for search, wherein the redefining is performed by deleting a last or more of letters in sequence in the query term entered by the user one by one until one or more relevant search results are generated in response to the redefined query term when the entered query term have a word length greater than the specific length as defined in the part name length determination step S160.
2. The method according to claim 1, wherein the part-dependent information construction step S120 comprises:
a word separation step S121 of separating respective words constituting each of sentences contained in the specifications for the semiconductor parts uploaded in the specification input step S110;

a description word extraction step S122 of extracting words necessary for a description from the words contained in the specifications, which are separated in the word separation step S121;

an extracted word entry step S123 of entering the words extracted in the description word extraction step S122 one by one in a specific array;

a word length determination step S124 of measuring and determining the length, i.e., the number of the extracted words stored in a separate storage space in the extracted word entry step S123; and a brief description designation step S125 of designating the words determined in the word length determination step S124 as words which are to be used in the brief description.

3. The method according to claim 2, wherein the search result output step S150 comprises:

a brief description acquisition step S151 of acquiring the words to be used in the brief description, which are designated in the brief description designation step S125;

a word-dependent link setting step S152 of setting a separate link by the words acquired in the brief description acquisition step S151;

a brief description output step S153 of displaying the words by which the link is set in the word-dependent link setting step S152 on the brief description of an output screen;

a link word click step S154 of determining whether or not the user clicks on a word for the relevant semiconductor part, which is described in the brief description; and a query addition step S155 of, when the user clicks on the word corresponding to the brief description, adding the clicked word to a search entry box searched by descriptions of the query entry step S130 to perform a search matching a relevant word or containing the relevant word.

4. The method according to claim 2, wherein the part search step S140 comprises:

a search result creation step S141 of comparing the query term for a semiconductor part, entered in the query entry step S130 with the words contained in the information of by semiconductor parts, which is constructed in the part specification storage device 120, and creating a search result of extraction of information regarding all the semiconductor parts, which contains the entered query term;

a matching value search step S142 of sequentially comparing the query term entered by the user with the search result created in the search result creation step S141, and, when there exists a matching word, separately searching only a semiconductor part corresponding to the matching word;

a matching value array creation step S143 of storing a result for the semiconductor part corresponding to a result of search in the matching value search step S142;

a starting value search step S144 of sequentially comparing the query term entered by the user with the search result created in the search result creation step S141, and separately searching only a semiconductor part containing words contained in information regarding all the semiconductor parts, which start as the word entered by the user and an additional alphabet follows;

a starting value array creation step S145 of storing a result for the semiconductor part corresponding to a result of search in the starting value search step S144;

an ending value search step S146 of sequentially comparing the query term entered by the user with the search result created in the search result creation step S141, and separately searching only a semiconductor part containing words contained in information regarding all the semiconductor parts, which terminate as the word entered by the user;

an ending value array creation step S147 of storing a result for the semiconductor part corresponding to a result of search in the ending value search step S146;

an inclusion value array creation step S148 of storing a result for the semiconductor parts remained after being subjected to the matching value search step S142, the starting value search step S144, and the ending value search step S146; and a shortcut creation step S149 of creating a shortcut so that the user can identify information regarding the semiconductor part, searched by the user using the created matching value array, the created starting value array, the created ending value array, and the created inclusion value array, and wherein the search result output step S150 comprises outputting, to the user, a search result included in a matching value array, a starting value array, an ending value array, and an inclusion value array of the shortcut by identifying the shortcut created in the shortcut creation step S149 using indices such as matching, starting, ending, and including.

5. The method according to claim 1, wherein the search result output step S150 comprises:

a brief description acquisition step S151 of acquiring the words to be used in the brief description, which are designated in the brief description designation step S125;

a word-dependent link setting step S152 of setting a separate link by the words acquired in the brief description acquisition step S151;

a brief description output step S153 of displaying the words by which the link is set in the word-dependent link setting step S152 on the brief description of an output screen;

a link word click step S154 of determining whether or not the user clicks on a word for the relevant semiconductor part, which is described in the brief description; and a query addition step S155 of, when the user clicks on the word corresponding to the brief description, adding the clicked word to a search entry box searched by descriptions of the query entry step S130 to perform a search matching a relevant word or containing the relevant word.

6. The method according to claim 5, wherein the part search step S140 comprises:

a search result creation step S141 of comparing the query term for a semiconductor part, entered in the query entry step S130 with the words contained in the information of by semiconductor parts, which is constructed in the part specification storage device 120, and creating a search result of extraction of information regarding all the semiconductor parts, which contains the entered query term;

a matching value search step S142 of sequentially comparing the query term entered by the user with the search result created in the search result creation step S141, and, when there exists a matching word, separately searching only a semiconductor part corresponding to the matching word;

a matching value array creation step S143 of storing a result for the semiconductor part corresponding to a result of search in the matching value search step S142;

a starting value search step S144 of sequentially comparing the query term entered by the user with the search result created in the search result creation step S141, and separately searching only a semiconductor part containing words contained in information regarding all the semiconductor parts, which start as the word entered by the user and an additional alphabet follows;

a starting value array creation step S145 of storing a result for the semiconductor part corresponding to a result of search in the starting value search step S144;

an ending value search step S146 of sequentially comparing the query term entered by the user with the search result created in the search result creation step S141, and separately searching only a semiconductor part containing words contained in information regarding all the semiconductor parts, which terminate as the word entered by the user;

an ending value array creation step S147 of storing a result for the semiconductor part corresponding to a result of search in the ending value search step S146;

an inclusion value array creation step S148 of storing a result for the semiconductor parts remained after being subjected to the matching value search step S142, the starting value search step S144, and the ending value search step S146; and a shortcut creation step S149 of creating a shortcut so that the user can identify information regarding the semiconductor part, searched by the user using the created matching value array, the created starting value array, the created ending value array, and the created inclusion value array, and wherein the search result output step S150 comprises outputting, to the user, a search result included in a matching value array, a starting value array, an ending value array, and an inclusion value array of the shortcut by identifying the shortcut created in the shortcut creation step S149 using indices such as matching, starting, ending, and including.

7. The method according to claim 1, wherein the part search step S140 comprises:

a search result creation step S141 of comparing the query term for a semiconductor part, entered in the query entry step S130 with the words contained in the information of by semiconductor parts, which is constructed in the part specification storage device 120, and creating a search result of extraction of information regarding all the semiconductor parts, which contains the entered query term;

a matching value search step S142 of sequentially comparing the query term entered by the user with the search result created in the search result creation step S141, and, when there exists a matching word, separately searching only a semiconductor part corresponding to the matching word;

a matching value array creation step S143 of storing a result for the semiconductor part corresponding to a result of search in the matching value search step S142;

a starting value search step S144 of sequentially comparing the query term entered by the user with the search result created in the search result creation step S141, and separately searching only a semiconductor part containing words contained in information regarding all the semiconductor parts, which start as the word entered by the user and an additional alphabet follows;

a starting value array creation step S145 of storing a result for the semiconductor part corresponding to a result of search in the starting value search step S144;

an ending value search step S146 of sequentially comparing the query term entered by the user with the search result created in the search result creation step S141, and separately searching only a semiconductor part containing words contained in information regarding all the semiconductor parts, which terminate as the word entered by the user;

an ending value array creation step S147 of storing a result for the semiconductor part corresponding to a result of search in the ending value search step S146;

an inclusion value array creation step S148 of storing a result for the semiconductor parts remained after being subjected to the matching value search step S142, the starting value search step S144, and the ending value search step S146; and a shortcut creation step S149 of creating a shortcut so that the user can identify information regarding the semiconductor part, searched by the user using the created matching value array, the created starting value array, the created ending value array, and the created inclusion value array, and wherein the search result output step S150 comprises outputting, to the user, a search result included in a matching value array, a starting value array, an ending value array, and an inclusion value array of the shortcut by identifying the shortcut created in the shortcut creation step S149 using indices such as matching, starting, ending, and including.

* * * * *